3,193,551
PREPARATION OF 1-ALPHA-THIENYL-PHENYL-
CARBINOLS
André Henri Passedouet, 4 Parc de Gaillon, Viroflay,
France, and Jacqueline Roberte Pigeot, 50 Ave. Egle,
Maison-Laffitte, France
No Drawing. Filed Jan. 3, 1964, Ser. No. 335,688
Claims priority, application France Aug. 30, 1963
7 Claims. (Cl. 260—247.1)

The present invention relates to an improved process for obtaining 1-alpha-thienyl-1-phenyl-carbinols of the general formula:

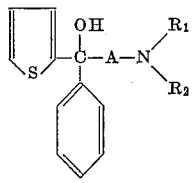

Formula I in which A is ethylene, and

is di-lower-alkylamino, morpholino or piperidino.

Carbinols substituted on the one hand by an amino-alkylenic residue, on the other hand by two aromatic rings or by heterocyclic rings, or by an aromatic ring and a heterocyclic ring, have been known for some time for their physiological and in particular spasmolytic properties. However, these properties vary in intensity according to the exact structure of the carbinol under consideration. This explains the abundant literature concerning them and the large number of these carbinols which have been studied physiologically.

The invention consists in a process for the preparation of a 1-alpha-thienyl-1-phenyl-carbinol having the formula:

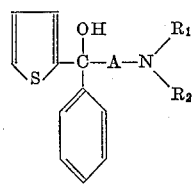

in which A and

have the above meaning, comprising the steps of liberating an amino-alkylene-alpha-thienone from an acid addition salt thereof by treatment with calcium hydroxide in the presence of an aromatic solvent having a boiling point between 100° and 200° C., reacting the thus-obtained aromatic solution of amino-alkylene-alpha-thienone with a phenyl magnesium halide in tetrahydrofuran, removing the tetrahydrofuran from the reaction mixture, and liberating the 1-alpha-thienyl-1-phenyl-carbinol as a free base from its magnesium complex in the reaction mixture.

The carbinols substituted by a phenol residue and an alpha-thienyl residue and prepared according to the process of the invention are of particular importance because of their high therapeutic index. They lend themselves moreover to the preparation, according to known methods, of ammonium quaternary salts, certain of which have been described for their great therapeutic effectiveness.

The thienyl-phenyl carbinols of Formula I may be obtained according to conventional reactions using intermediate organomagnesium derivatives.

According to one of these reactions phenyl-magnesium bromide is reacted on an amino-alkylenethienone according to the reaction:

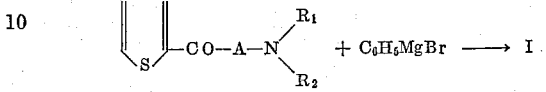

Formula II or alpha-thienyl magnesium bromide is reacted with an amino-alkylenephenone according to the reaction:

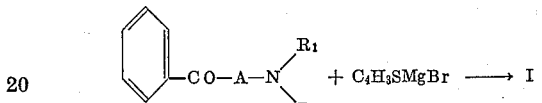

Formula III or an equimolecular mixture of phenyl magnesium bromide and alpha-thienyl magnesium bromide is reacted upon an amino-alkylene carboxylic ester according to the reaction:

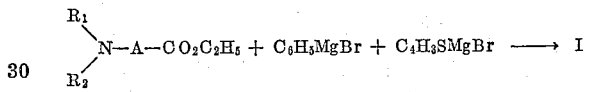

Formula IV

The applicants have carried out systematic investigations upon the practical achievement of the above described reactions.

As regards the reaction of Formula IV it has been established that the reaction product is a complex mixture of intermediate products, such as substituted diphenyl-carbinol, substituted dithienylcarbinol and a number of by-products from which the product sought has been found to be separable only with very great difficulty. In fact, while the principle of the reaction IV has been claimed in certain patents, there is no description of the isolation of carbinols of structure I in a pure state, which is obviously necessary in obtaining a compound for therapeutic use. Reaction IV has thus not been shown to be commercially practicable.

As regards the reaction of Formula III, it has been found that a considerable excess of magnesium derivative was necessary to obtain complete transformation as shown in the equation. These conditions mean a very high market price for the final product because of the high cost of alpha-thienyl magnesium bromide and the difficulty of preparing it.

The applicants have perfected an improved industrial process for the preparation of carbinols of Formula I according to a procedure derived from reaction III.

At the beginning of this perfecting process the state of the art was shown particularly by French patent specification No. 941,465 of February 12, 1947, at present in common use. This specification describes the preparation of 1-phenyl 1-(2-thienyl)-3-piperidino-1-propanol by the reaction of phenyl magnesium bromide in ethyl ether on alpha-piperidino-methyl-2-propriothienone: that is to say a typical reaction II.

The applicants have improved the synthesis of the carbinols of Formula I in the following respects:

(1) An amino-alkylene-thienone is obtained by a Mannich reaction or other suitable method. This amino-thienone is stable in salt form, for example as the hydrochloride, but it decomposes rapidly in the form of a free base in an alkaline medium. The liberation of this base from one of its salts has been previously described, by treatment with a caustic alkali and extraction with a solvent such as ether, the solution obtained being used for subsequent condensation with phenyl magnesium bromide. The instability of the base in the presence of alkaline agents brings with it a great drop in yield when operations are carried out on an industrial scale. The applicants have developed a process for liberating the amino-thienone, with good yield and a satisfactory stability of amino-thienone, the process consisting in treating the hydrochloride of the base with calcium hydroxide in the presence of an aromatic solvent with a boiling point between 100° C. and 200° C. The liberated base is dissolved in the solvent while the calcium chloride formed contributes to the dehydrating of the medium. Moreover the aromatic solvent is much easier to handle than the ethyl ether which has been previously used, because it is less volatile, less inflammable and much more hydrophobic. The solution of the base is filtered in order to separate the hydrated calcium chloride formed.

Homologues of benzene with a boiling point of between 100° C. and 200° C. can be used as aromatic solvents: for example, toluene, xylenes, and isopropylbenzene. According to a preferred embodiment of the process according to the invention, commercial xylene is used, this being a mixture of three isomers and having a boiling point between 138° C. and 143° C.

(2) The amino-alkylene-thienone base in solution in an aromatic solvent, obtained as has just been described, is condensed with an excess of phenyl magnesium halide. According to the process of the invention, the phenyl magnesium halide is prepared in tetrahydrofuran and the aromatic solution of amino-alkylene-thienone is reacted with this tetrahydrofuran solution. The advantages of the preparation of phenyl magnesium chloride and bromide in tetrahydrofuran have been described in French patent specification No. 1,133,783 of October 28, 1955, the process of which patent is now in common use. The use of tetrahydrofuran allows the Grignard reagent to be obtained more quickly and with greater yield. It also allows chloro-benzene to be used instead of bromobenzene, whereas to do this with conventional methods it is necessary to work in extraordinary conditions, for example at high pressure and at 160° C. for 3 to 4 hours, and then only very low yields are obtained. The process of the invention, which is a practical industrial method of preparation, is based upon these improvements.

Advatages specifically related to the reaction of formation of alpha-thienyl-phenyl-carbinols according to the process also result from the use of tetrahydrofuran. Thus, experiments have shown that, all things otherwise being equal, the yield of final product is considerably greater when phenyl magnesium halide is used in solution in tetrahydrofuran than when it is used in a solution of ethyl ether. This superior reactivity of the Grignard reagent in tetrahydrofuran allows the optimum excess of the reagent to be collected, being 60 to 80% of the theoretical quantity, while the Grignard reagent in ethyl ether must be used, according to the literature and the experiments of the applicants, in an excess of 100 to 200%, and in spite of this increased consumption of the reagent the yield of final product remains considerably lower than that obtained according to the process of the invention.

Also, the industrial handling of the two solvents (an aromatic solvent with boiling point between 100° and 200° C. and tetrahydrofuran) is simple, both these solvents being easily condensable when distilled (which is not the case with ethyl ether), and the two solvents have a difference in boiling point sufficiently great to allow them to be easily separated (tetrahydrofuran has a boiling point of 66° C. and xylene, for example, 138–142° C.).

The process according to the invention is particularly useful for the manufacture of carbinols of Formula I in which A represents an ethylenic group —CH₂—CH₂—. It is known that the Mannich bases have in this case a particular instability due especially to their splitting up into an unsaturated thienone and an amine, according to the reaction:

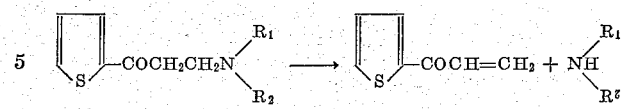

The presence of strong alkali catalyses this decomposition, and the liberation of the base by means of calcium hydroxide in the process of the invention allows higher yields of pure products to be obtained.

Also in the case where A represents —CH₂—CH₂—, the carbinols of Formula I have a certain tendency to dehydration, which tendency may be catalysed by means of the strong alkalies or acids. The applicants have found that it is advantageous to purify the final carbinols not in the state of a hydrochloride or of strong mineral acid salts but in the form of a free base.

The examples which follow illustrate the invention, without being of a limiting character.

EXAMPLE 1

110 parts by weight of 1-alpha-thienyl-3-morpholino-propanone hydrochloride obtained according to the method of Harradence and Lions (J. Proc. Roy. Soc. N.S. Wales 72, 233—1938):

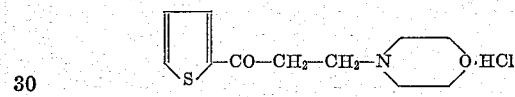

are suspended in 335 volume of dry xylene (commercial mixture containing the three isomers).

While stirring, and at ordinary temperature, 61 parts by weight of hydrated lime titrating at 90% are added in powder form. Vigorous stirring is kept up for 2 hours. The xylene solution is dried and the hydrated calcium chloride which has crystallised is washed with 80 volumes of xylene. The washing xylene is added to the principal solution. The combined xylene solutions are titrated acidimetrically using perchloric acid. It is found that 95% of the base contained in the hydrochloride has passed into this xylene solution.

The xylene solution of the base is kept at ordinary temperature for 7 days. At the end of this period it is found that the amount of base remains unchanged.

In a comparative experiment, the hydrochloride of the base is neutralised by the theoretical quantity of 36° Bé. caustic soda, the base being extracted by means of ethyl ether. The formation of morpholine is observed, which morpholine is separated by extraction in water of the ether phase. According to the period of contact of the base with the alkaline wash and the washing waters, the titration of the base indicates a maximum yield of 80%, dropping to 30% when the period of contact of the base with the dilute alkaline solution reaches 3 hours.

EXAMPLE 2

A mixture of 1840 parts in weight of bromobenzene and of 3250 volumes of dry tetrahydrofuran is gradually added to 276 parts by weight of magnesium filings, the reaction being started by adding some iodine crystals. As soon as sufficient liquid has been added the mixture is well stirred. The operation is carried out at a temperature of 40 to 45° C. throughout. The formation of the Grignard reagent is followed by means of iodometric titration. At the end of 4 hours a maximum rate of transformation of the magnesium is reached, this rate being 75%.

The resulting solution of phenyl magnesium bromide in tetrahydrofuran is reacted with a 1-alpha-thienyl-3-morpholino-propanone solution in xylene, obtained by the method of Example I.

For this purpose the solution of phenyl magnesium bromide is cooled to 8° C. and while it is being vigorously stirred and kept below 10° C. the solution of alpha-thienyl-morpholino-propanone is gradually added. When the addition has been effected, the reaction mixture is allowed to return to normal temperature and is allowed to stand for 15 hours. The tetrahydrofuran is then distilled under a slight vacuum, the reaction mixture being heated to between 40° C. and a maximum of 45° C.

The magnesium complex is then destroyed by pouring it on to crushed ice. It is progressively acidified by adding acetic acid to dissolve the magnesium formed, stopping at a pH of 6. The solution is then made alkaline by means of an excess of ammonia up to pH 9, which liberates the amino-alcohol without re-precipitating the magnesium. The xylene solution of amino-alcohol is washed three times with water and decanted each time. The xylene is then driven off by distilling under reduced pressure at a temperature of 90 to 95° C. The residue, formed of the crude amino-alcohol, is purified by dissolving in three parts by weight of 55% aqueous ethanol at a temperature of 70° C. treatment by 3% of carbon black, filtration and freezing.

Recrystallised 1-alpha-thienyl-1-phenyl-3-morpholino-1-propanol is obtained:

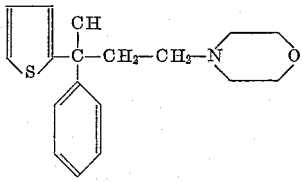

Its purity is checked by titrating to find its perchloric base index: 183 (theoretically 185), its solidification point: 84° C., and its fusion point on the Maquenne block: 85° C. The absence of ketonic products is checked by measuring the CO groups, characterised by their infrared absorption band at a wavelength of 6μ. When the measurement is effected on a 1% xylene solution an absorption lower than 0.004 is revealed. In comparison, the methods not in accordance with the invention provide products with percentages of ketonic products 20 times greater and even more.

EXAMPLE 3

Examples 1 and 2 relate to the liberation of the Mannich base and to the preparation of the Grignard reagent and its reaciton with the Mannich base.

The following table shows the influence of different excesses of the Grignard reagent upon the yield of final purified products in the course of the reaction, the quantity of reagent being titrated by iodometry.

| Excess of phenyl magnesium bromide in relation to the Mannich base, percent | Yield of 1-alpha-thienyl-1-phenyl-3-morpholino-1-propanol, percent |
|---|---|
| 47 | 40 |
| 55 | 51 |
| 70 | 63 |
| 77 | 66 |
| 87 | 65 |

In comparative experiments, liberating the Mannich base by means of caustic soda in the presence of ether, and preparing phenyl magnesium bromide in ether and making the two ether solutions react at the boiling point of ether, adding a 100% excess of the Grignard reagent, a yield of 42% of recrystallised amino-alcohol of comparable purity is obtained.

EXAMPLE 4

Phenyl magnesium chloride is prepared by reacting 288 parts by weight of magnesium filings and 100 parts by weight of bromobenzene in 150 volumes of tetrahydrofuran, in the presence of some crystals of iodine to start off the reaction. Then 1450 parts by weight of chlorobenzene mixed with 2100 volumes of tetrahydrofuran are gradually added. The temperature is kept at 40 to 45° C. When all the chlorobenzene has been added the temperature is raised to 70° C., refluxing the tetrahydrofuran, for 4 hours. At the end of this period an iodometric measurement of phenyl magnesium chloride indicates a magnesium transformation rate of 60% into the derivative sought. The phenyl magnesium chloride solution in tetrahydrofuran is reacted with 1-alpha-thienyl-3-morpholino-1-propanone under conditions similar to those of Example 2. An excess of 80% of phenyl magnesium chloride is added, as shown by iodometry to be advantageous.

The reactivity of the phenyl magnesium chloride is shown in this reaction to be lower than that of the phenyl magnesium bromide in that the final crude amino-alcohol shows by infra-red spectrography a higher percentage of ketonic by-products. Two recrystallisations allow pure 1-alpha-thienyl-1-phenyl-3-morpholino-1-propanol to be obtained with a yield of 40% of the theoretical, based on the Mannich base used.

EXAMPLE 5

According to the working conditions of Example 1, hydrated lime is reacted with 1-alpha-thienyl-dimethyl-amino-1-propanone hydrochloride obtained by the Mannich reaction from formaldehyde alpha-aceto-thienone and dimethylamine hydrochloride. The Mannich base is liberated and passes in solution into the xylene with a yield of 92%. With the working conditions as in Example 2, an excess of 80% of phenyl magnesium bromide in solution in tetrahydrofuran is reacted with this solution. After recrystallisation from 50% ethanol in the presence of 3% of decolourising charcoal, 1-alpha-thienyl-1-phenyl-3-dimethylamino-1-propanol is obtained:

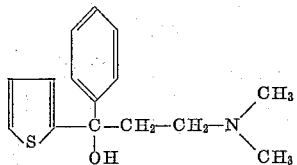

The perchloric base index is 208 (theoretically 214), and the melting point is 126° C.

EXAMPLE 6

Under the working conditions of Examples 1 and 2, 0.35 mole of phenyl magnesium bromide is reacted with 0.25 mole of 1-alpha-thienyl-3-piperidyl-1-propanone. After recrystallisation in 55% ethanol, 1-alpha-thienyl-phenyl-3-piperidyl-1-propanol is obtained:

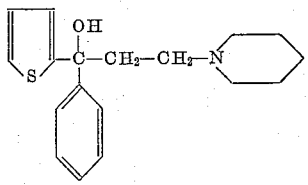

having a perchloric base index of 186 (theoretically 186), and a melting point of 98° C. The melting point of the picrate is 131° C.

EXAMPLE 7

*Use of toluene instead of xylene*

The procedure, carried out on a working unit of 0.22 mole, is divided into three parts.

(1) PHENYL MAGNESIUM BROMIDE (WORKING UNIT 0.5 MOLE)

This is prepared by the addition at 40–45° C. of a solution of 81 g. of bromobenzene (0.51 mole) in 120 g. of tetrahydrofuran to 12 g. of magnesium and 45 g. of tetrahydrofuran. After dissolution of the magnesium, the magnesium reagent is titrated iodometrically. Yield 75% (0.375 mole).

(2) PREPARATION OF THE 1-ALPHA-THIENYL-3-MOR-PHOLINO-1-PROPANONE SOLUTION (WORKING UNIT 0.23 MOLE)

A mixture of 60 g. (0.23 mole) of 1-alpha-thienyl-3-morpholino-1-propanone hydrochloride 34 g. of slaked lime, and 200 g. of toluene is subjected to vigorous stirring for 2 hours at ordinary temperature.

The solid is filtered, and stirred in a paste for an hour with 50 g. of toluene. The combined toluene phases are titarated to find the base index in an acetic medium with perchloric acid. A 95% yield of aminoketone is obtained (0.22 mole).

(3) CONDENSATION (WORKING UNIT 0.22 MOLE)

The reaction mixture of phenyl magnesium bromide is cooled to 5–10° C., and the toluene solution of aminoketone is added in this temperature interval over one hour.

The reaction mixture is then heated to 35° C. and pressure is progressively reduced in order to distil off the tetrahydrofuran.

The magnesium complex is destroyed by addition of 150 g. of ice in 50 g. of water to the mixture.

36 g. of acetic acid are progressively added, with stirring to pH 6; then the solution is made alkaline with 15 g. of commercial ammonia solution (up to pH 9). Two clear liquid phases are then obtained; the aqueous phase is decanted and the organic phase is washed three times with 100 cc. of distilled water.

The toluene phase is controlled by:

Measurement of the base index in an acetic medium by means of perchloric acid (93% of the base is recovered in relation to the aminoketone used).

Infra-red examination at 6.0μ (to determine the presence of ketonic groups)

$$A \begin{cases} 1\% \text{ (xylene)} \\ 100\mu \end{cases} \text{ at } 6.0\mu = 0.023$$

The toluene solution is concentrated under reduced pressure (20 mm.) by heating in a water bath to a constant weight. The residue is redissolved in three times its weight of 55% ethanol and decolourised with activated charcoal CECA 50S at 60°.

The amino-alcohol crystallises in the course of freezing with stirring of the solution. It is then drained and dried at 50°. Yield: 65% (48 g.).

Characteristics of the product obtained:

Perchloric base index in an acetic medium, 177 (theoretically 185)

Cryoscopic stage, 81°

Infra-red examination (presence of ketonic groups)

$$A \begin{cases} 1\% \text{ (xylene)} \\ 100\mu \end{cases} \text{ at } 6.0\mu = 0.003$$

Acidity developed by quternarisation (by CH₃I) = 3.1% expressed in molecules

EXAMPLE 8

Use of formic acid instead of acetic acid

The procedure carried out on a working unit of 0.22 mole, is divided into three parts:

(1) PHENYL MAGNESIUM BROMIDE (WORKING UNIT 0.5 MOLE)

This is prepared by the addition at 40–45° C. of a solution of 81 g. of bromobenzene (0.51 mole) in 120 g. of tetrahydrofuran to 12 g. of magnesium and 45 g. of tetrahydrofuran.

After dissolution of the magnesium, the magnesium reagent is titrated iodometrically. Yield 75% (0.375 mole).

(2) PREPARATION OF THE 1-ALPHA-THIENYL-3-MOR-PHOLINO-1-PROPANONE SOLUTION (WORKING UNIT 0.23 MOLE)

A mixture of 60 g. (0.23 mole) of 1-alpha-thienyl-3-morpholino-1-propanone-hydrochloride, 34 g. of slaked lime and 160 g. of xylene is subjected to vigorous stirring for 2 hours at ordinary temperature.

The solid is filtered, and stirred in a paste for an hour with each of two 60 g. portions of xylene. The combined xylene phases are titrated to find the base index in an acetic medium with perchloric acid. A 95% yield of aminoketone (0.22 mole) is obtained.

(3) CONDENSATION (WORKING UNIT 0.22 MOLE)

The reaction mixture of phenyl magnesium bromide is cooled to 5–10° C. and the xylene solution of aminoketone is added in this temperature interval over one hour. The reaction mixture is then heated to 60° C. and the pressure is progressively reduced in order to effect the distillation of tetrahydrofuran. The magnesium complex is destroyed by addition to the mixture of 150 g. of ice in 50 g. of water.

About 24 g. of formic acid are progressively added with stirring up to pH 5; then the solution is made alkaline with 50 g. of commercial ammonia solution (up to pH 9). Two clear liquid phases are obtained: the aqueous phase is decanted and the organic phase is washed three times with 100 cc. of distilled water. The xylene phase is controlled by:

Perchloric base index in an acetic medium, 82% of base is recovered (in relation to the aminoketone used)

Infra-red examination at 6.0μ (presence of ketonic groups)

$$A \begin{cases} 1\% \\ 100\mu \end{cases} \text{ at } 6.0\mu = 0.018$$

The xylenic solution is concentrated under reduced pressure (20 mm.) with heating in a water bath until constant weight is obtained. The residue is redissolved in three times its weight of 55% ethanol and decolourised with active charcoal CECA 50S at 60°.

The aminoalcohol crystallises in the course of freezing with stirring of the solution; it is filtered and dried at 50° C. The yield is 63% (44 g.).

Characteristics of the products obtained:

Perchloric base index in an acetic medium, 178 (theoretically 185)

Cryoscopic stage 80°

Infra-red examination (ketonic groups)

$$A \begin{cases} 1\% \text{ (xylene)} \\ 100\mu \end{cases} \text{ at } 6.0\mu = 0.0002$$

Acidity developed by quaternarisation (by means of CH₃I) = 3% expressed in molecules

We claim:

1. A process for the preparation of a 1-alpha-thienyl-1-phenyl-carbinol of the formula

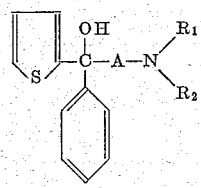

wherein A is ethylene and

is selected from the group consisting of di-lower-alkylamino, morpholino and piperidino, which comprises liberating an amino-ethylene-alpha-thienone from an acid addition salt thereof by treatment with calcium hydroxide in the presence of an aromatic solvent having a boiling point between 100° and 200° C., the thus obtained aromatic solution of amino-ethylene-alpha thienone with a phenyl magnesium halide in tetrahydrofuran, removing the tetrahydrofuran from the reaction mixture, and liberating the 1-alpha-thienyl-1-phenyl-carbinol as a free base from its magnesium complex in the reaction mixture by cooling and acidification to a pH of about 5–6.

2. A process as claimed in claim 1, wherein the acidification is carried out with dilute acetic acid.

3. A process as claimed in claim 1, wherein said aromatic solvent is toluene.

4. A process as claimed in claim 1, wherein said acid addition salt is the hydrochloride.

5. A process of claimed in claim 1, wherein the acidification is carried out with dilute formic acid.

6. A process as claimed in claim 1, wherein said aromatic solvent is xylene.

7. A process as claimed in claim 1, wherein said aromatic solvent is isopropylbenzene.

References Cited by the Examiner
UNITED STATES PATENTS

| | | | |
|---|---|---|---|
| 2,680,115 | 6/54 | Ruddy et al. | 260—247 |
| 2,837,525 | 6/58 | Ruddy et al. | 260—247 |

NICHOLAS S. RIZZO, *Primary Examiner.*